United States Patent

Cameron

(10) Patent No.: US 9,405,277 B2
(45) Date of Patent: Aug. 2, 2016

(54) INTEGRATED UPSAMPLER AND FILTERING FOR MULTI-RATE CONTROLLER FOR ELECTROMECHANICAL FLIGHT ACTUATION SYSTEM

(71) Applicant: The Boeing Company, Chicago, IL (US)

(72) Inventor: Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 126 days.

(21) Appl. No.: 14/182,151

(22) Filed: Feb. 17, 2014

(65) Prior Publication Data

US 2016/0154384 A1   Jun. 2, 2016

Related U.S. Application Data

(63) Continuation of application No. 12/892,853, filed on Sep. 28, 2010, now Pat. No. 8,653,780.

(51) Int. Cl.
*G05B 6/02* (2006.01)
*B64C 19/00* (2006.01)

(52) U.S. Cl.
CPC . *G05B 6/02* (2013.01); *B64C 19/00* (2013.01); *G05B 2219/41427* (2013.01)

(58) Field of Classification Search
CPC .......................... G05B 6/02; G05B 2219/41427
USPC .......................................................... 318/621
See application file for complete search history.

(56) References Cited

U.S. PATENT DOCUMENTS

| | | | |
|---|---|---|---|
| 5,005,089 A | | 4/1991 | Thanos et al. |
| 6,006,637 A | * | 12/1999 | Sanders et al. .................... 83/53 |
| 6,204,823 B1 | * | 3/2001 | Spano et al. ................... 343/766 |
| 6,614,615 B1 | | 9/2003 | Ju et al. |
| 6,614,618 B1 | | 9/2003 | Sheh |
| 6,636,377 B1 | | 10/2003 | Yu et al. |
| 2006/0108864 A1 | * | 5/2006 | Evans et al. ................... 303/126 |
| 2010/0128238 A1 | | 5/2010 | Sanchez |

OTHER PUBLICATIONS

U.S. Appl. No. 12/892,853, Notice of Allowance, Oct. 23, 2013.
European Search Report and Search Opinion, European Application No. 11179824.5 (Oct. 17, 2014).

(Continued)

*Primary Examiner* — Erick Glass
(74) *Attorney, Agent, or Firm* — Thompson Hine LLP (57) ABSTRACT

A multi-rate system for controlling an actuator may include an incremental command limiter that receives a command from a first control system and outputs a limited incremental command; a feed-forward that receives the limited incremental command from the incremental command limiter and outputs a feed forward rate command; a first differentiator that limits the limited incremental command to a maximum allowable command; an upsampler state that outputs a current state back to the differentiator; a first summer that receives the limited incremental command and the current state from the upsampler state, and outputs an incremental position command; and a second summer that combines the incremental position command and the feed forward rate command to produce a rate error output signal.

22 Claims, 6 Drawing Sheets

(56) References Cited

OTHER PUBLICATIONS

Bullock, T.B. et al., "Taking the mystery out of motion-control algorithms," Machine Design, vol. 67, No. 1, pp. 78-84 (Jan. 12, 1995).

Gu, Y. et al., "Digital Redesign and Multi-rate Control for Motion Control—a general approach and application to hard disk drive servo system," Advanced Motion Control, 2000, Proceedings of the 6th International Workshop, Mar. 30-Apr. 1, 2000, Piscataway, NJ, USA IEEE, pp. 246-251 (Apr. 1, 2000).

Salt, J. et al., "Multirate Controllers Design by Rate Decomposition," Proceedings of the 39th IEEE Conference on Decision and Control, Sydney, Australia, Dec. 2000, IEEE, vol. 5, pp. 4895-5900 (Jan. 1, 2001).

* cited by examiner

INTEGRATED UPSAMPLER AND FILTERING FOR MULTI-RATE CONTROLLER FOR ELECTROMECHANICAL FLIGHT ACTUATION SYSTEM

UNITED STATES GOVERNMENT RIGHTS

This invention was made with United States Government support under the Risk Reduction Program, contract number 092AG9091. The United States Government has certain rights in this invention.

FIELD

Embodiments of the subject matter described herein relate generally to a system and method for upsampling and filtering a control signal in a control system that uses a different sampling rate than sampling rate of the control signal.

BACKGROUND

Many systems today, especially complex avionics systems, utilize pieces of mature technology that are combined with new technology to make the new system. It is generally more economical to use existing pieces of technology, rather than building something completely from the ground up. Reusing technology saves engineering resources that can be put to better use for other parts on the system and often results in a product getting to market faster. Reusing technology saves test and verification time and resources, because a part that has already been qualified for a similar purpose generally does not need as many test cycles to verify.

Feedback control systems are commonly used in closed-loop flight control systems and other industrial or commercial products. Some well known feedback control system include lead-lag compensators and PID, or proportional plus integral plus derivative, feedback control loops. Lead-lag compensators and PID feedback control loops are well known in the art for stabilizing physical systems.

Flight control systems sometimes incorporate system components from different manufacturers that are combined to make a new system. System components that have somewhat different design specifications and parameters can exhibit undesirable behavior when integrated together into a new system. For example, the sampling frequency for commands sent from a master computer to a closed-loop flight control system might be designed at a first frequency chosen so that the pilot or master computer has sufficient temporal granularity to accomplish a desired range of aerodynamic performance of the platform. However, the closed-loop flight control system may operate at a second much higher frequency that is designed to quickly adjust control surfaces during high speed flight with a much finer temporal granularity.

When commands are sent by the master computer at the first frequency, the closed-loop flight control system immediately adjusts the flight control surfaces in accordance to the command from the master computer at the second frequency of the closed-loop flight control system. When the closed-loop flight control system is operating at a higher frequency, or faster sampling rate, than the master computer, the closed-loop flight control system will have to wait a number of cycles between commands. This results in periodic, start-and-stop behavior of the electro-mechanical closed-loop flight control system in response to the commands from the master computer. The start-and-stop behavior acts like a "jack-hammer" on the platform and triggers structural modes at the first frequency of the commands from the master computer, causing the flight control system to exhibit undesirable behavior.

One undesirable behavior that is triggered by the start-and-stop behavior is the creation of high current spikes that are sent to the flight control surfaces. When a command is received, the faster closed-loop flight control system immediately causes an actuation of a flight control surface, followed by the PID feedback loop attempting to stabilize the control surface to value presented in the command. This actuation by the closed-loop flight control system occurs at a high slew rate—the sampling rate of the closed-loop flight control system. This potentially results in full current commands during long slews, either with or without loads on the control surfaces.

The current spikes are followed by valleys of relatively low current usage by the flight control surfaces. This periodic demand of high current spikes followed by valleys of low current demand is inefficient from a power perspective, because it requires bigger power systems to supply power for the current spikes and also requires heavier wiring between systems. These current spikes place strains on the flight control surfaces. For example, current spikes associated with typical commands being operated on by the closed-loop flight control system can generate maximum loads on the flight control surfaces. High loads decrease the lifespan of components, requiring more scheduled maintenance and reducing the number of missions between servicing.

Another undesirable behavior resulting from the start-and-stop behavior is that lead-lag or PID feedback loop may not exhibit a desirable 40 dB/decade roll off past the specified bandwidth frequency of the closed-loop flight control system. This can lead to potential instability of the closed-loop flight control system. Attempts to attenuate the start-and-stop behavior generally result in increased phase changes that can create further instability in the system. For example, bi-quad filters on the command path can be used to smooth the command itself, but can cause unacceptable phase loss.

SUMMARY

The disclosed system and method for integrating multi-rate systems using a combination of nonlinear and linear filtering may be useful in reducing or eliminating start-and-stop behavior in closed-loop control systems that utilize control systems that operate at different sample rates. In an embodiment, a multi-rate system for controlling an actuator may include an incremental command limiter that receives a command from a first control system and outputs a limited incremental command; a feed-forward that receives the limited incremental command from the incremental command limiter and outputs a feed forward rate command; a first differentiator that limits the limited incremental command to a maximum allowable command; an upsampler state that outputs a current state back to the differentiator; a first summer that receives the limited incremental command and the current state from the upsampler state, and outputs an incremental position command; and a second summer that combines the incremental position command and the feed forward rate command to produce a rate error output signal.

In another embodiment, an aircraft may include an actuator; a position/rate feedback sensor that is connected to the actuator; a flight control system having master computer and a flight actuator controller, the master computer connected to send a command signal to the flight actuator controller, and the flight actuator controller connected to send an actuation signal to cause the actuator to reposition the flight control surface, wherein the master computer sends the command signal at a first sample rate, and the flight actuator operates at a second, different sample rate; and an integrated upsampler associated with the flight actuator controller and connected to receive the command signal from the master computer and produce a command to the actuator, the integrated upsampler including an incremental command limiter that receives a command from the master computer and outputs a limited incremental command; a feed-forward that receives the limited incremental command from the incremental command limiter and outputs a feed forward rate command; a first differentiator that limits the limited incremental command to a maximum allowable command; an upsampler state that outputs a current state back to the differentiator; a first summer that receives the limited incremental command and the current state from the upsampler state, and outputs an incremental position command; and a second summer that combines the incremental position command and the feed forward rate command to produce a rate error output signal.

In yet another embodiment, a method for integrating multi-rate control systems having different sample rates may include receiving by an incremental command limiter a command from a first control system, and outputting a limited incremental command; receiving the limited incremental command by a feed-forward, and outputting a feed forward rate command; a first differentiator that limits the limited incremental command to a maximum allowable command; outputting by an upsampler state a current state back to the differentiator; receiving by a first summer the limited incremental command and the current state from the upsampler state, and outputting an incremental position command; and combining by a second summer the incremental position command and the feed forward rate command to produce a rate error output signal.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method for integrating multi-rate systems for electro-mechanical flight actuation using an integrated upsampler and filter. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
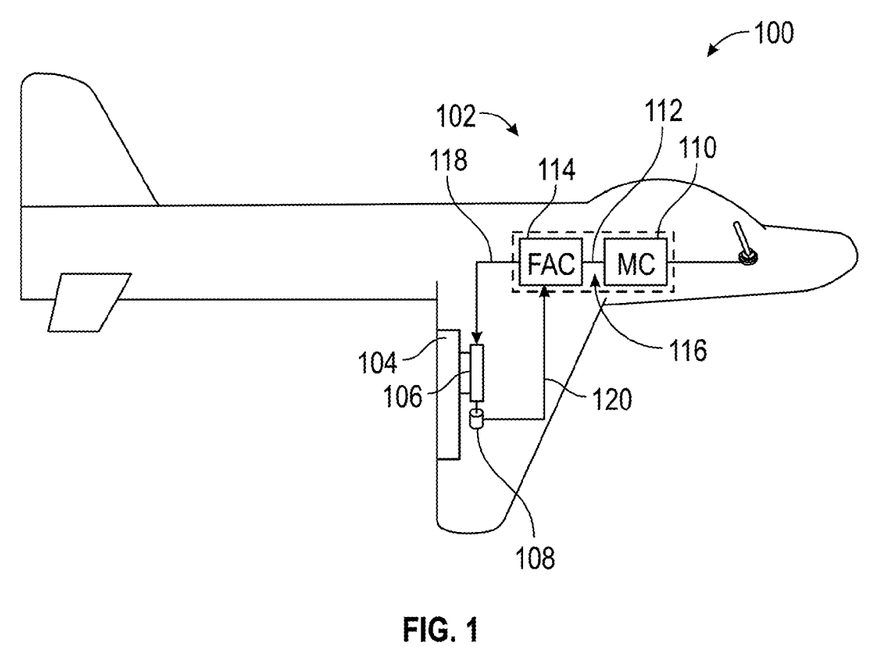
FIG. 1 is a diagram of a flight control system in one embodiment of the system and method for integrating multi-rate systems for electro-mechanical flight actuation using an integrated upsampler and filter.

Referring now to FIG. 1, an exemplary flight control system 100 is presented that embodies the subject multi-rate system for controlling an actuator. The flight control system 100 comprises a vehicle 102, such as an aircraft, that has a flight control surface 104, such as an aileron, whose position is controlled by an actuator 106, such as an electromechanical actuator. The actuator 106 or the flight control surface 104 are in communication with a position/rate feedback sensor 108, for example a rotary sensor that is connected to the actuator 106. The position/rate feedback sensor 108 allows the flight control system 100 to know the precise position, angular rotation, and rate of the flight control surface 104. A master computer or first control system 110 sends a command signal 112 instructing the flight actuator controller (FAC) or second control system 114 to reposition the flight control surface 104 to a particular position or angular rotation. The FAC 114, which is usually located in the avionics bay 116, sends an actuation signal 118 to the actuator 106 to move the flight control surface 104. In embodiments, the actuation signal 118 is a current or a signal to another device to supply current into the actuator 106 to actuate the flight control surface 104. A feedback signal 120 returns from the position/rate feedback sensor 108 to the FAC 114.

In a flight control system 100 it is possible to have a master computer 110 that is issuing flight related commands at a first sample rate or frequency and a flight actuation control system or FAC 114 that operates at a second faster sample rate or higher frequency. For example, the sampling frequency for commands sent from a master computer 110 to the flight control system, or FAC 114, might be designed at a first frequency chosen so that the pilot and master computer 110 has sufficient temporal granularity to accomplish a desired range of aerodynamic performance of the platform, or vehicle 102. However, the FAC 114 may operate at a second much higher frequency that is designed to quickly adjust control surfaces 104 during high speed flight with a much finer temporal granularity.

Because of the differences in the sample rates, or frequencies, between the two system components, the master computer 110 and the FAC 114, an undesirable behavior can result. For example, if the master computer 110 operates at 50 Hz, then 50 times per second the master computer 110 would send command signals 112 to update the actuator 104 position to the flight actuator controller or FAC 114. However, if the FAC 114 operates at 2000 Hz, then the FAC 114 operates the flight actuators 104 at 2000 Hz. Because of this difference between the sample rates, or frequencies, the FAC 114 sees the command signals 112 as a series of stair-step position commands from the master computer 110 that are spaced 40 cycles apart. That is, after the FAC 114 sees a first command signal 112, the FAC 114 does not see a change in the position of the control surface via a change in the command signal 112 for another 40 cycles (2000 Hz/50 Hz.) When the FAC 114 sees the next command signal 112 with a change, it immediately changes the position of the flight control surface 104, and then waits another 40 cycles for the next command signal 112.

The maximum increment between 2000 Hz samples should be RateLimit/2000. But, it is using RateLimit/50. Therefore, the response of the FAC 114 is to a rate that appears 40 times greater than desired by the master computer 110. This high rate command during the first 0.006 seconds of the 50 Hz frame causes a jerking and full current command. The response of the actuator 106 is a jerking, then as the position rate error becomes in the stabilizing direction, the actuation torque is arresting. Therefore, a jerk forward, slow down, jerk forward, slow down motion occurs at 50 Hz. This effectively causes a 50 Hz jack-hammering from an 8 Hz bandwidth actuation system.

Before the disclosed upsampler, many methods were attempted to attenuate the jack-hammering, but they resulted in increased phase at the 1-2 Hz frequencies, where the master computer 110 stability margins are extremely critical. For instance, bi-quad filters on the command path smoothed the "jerk," but caused unacceptable phase loss at 1 to 2 Hz that could not be tolerated by the master computer 110. Changing the FAC 114 commanding from position commands at 50 Hz to rate commands at 50 Hz, would eliminate the jack-hammering. The master computer 110 would need to close the position loop, but the cost of overhauling the completed master computer software would be too costly, require years of rework and certification, and would be less robust than the FAC 114 closing the position loops. Therefore, a method that eliminated the jack-hammering, reduced phase loss at low frequencies, and preserved the quick response under load was needed. The upsampler 204 provides this solution. In other words, in a flight control system 100 the upsampler 204 enables operable compatibility between multi-rate systems such as a first control system 110 and second control system 114 or components to ensure smooth control of an actuator 106.

Figure 2A:
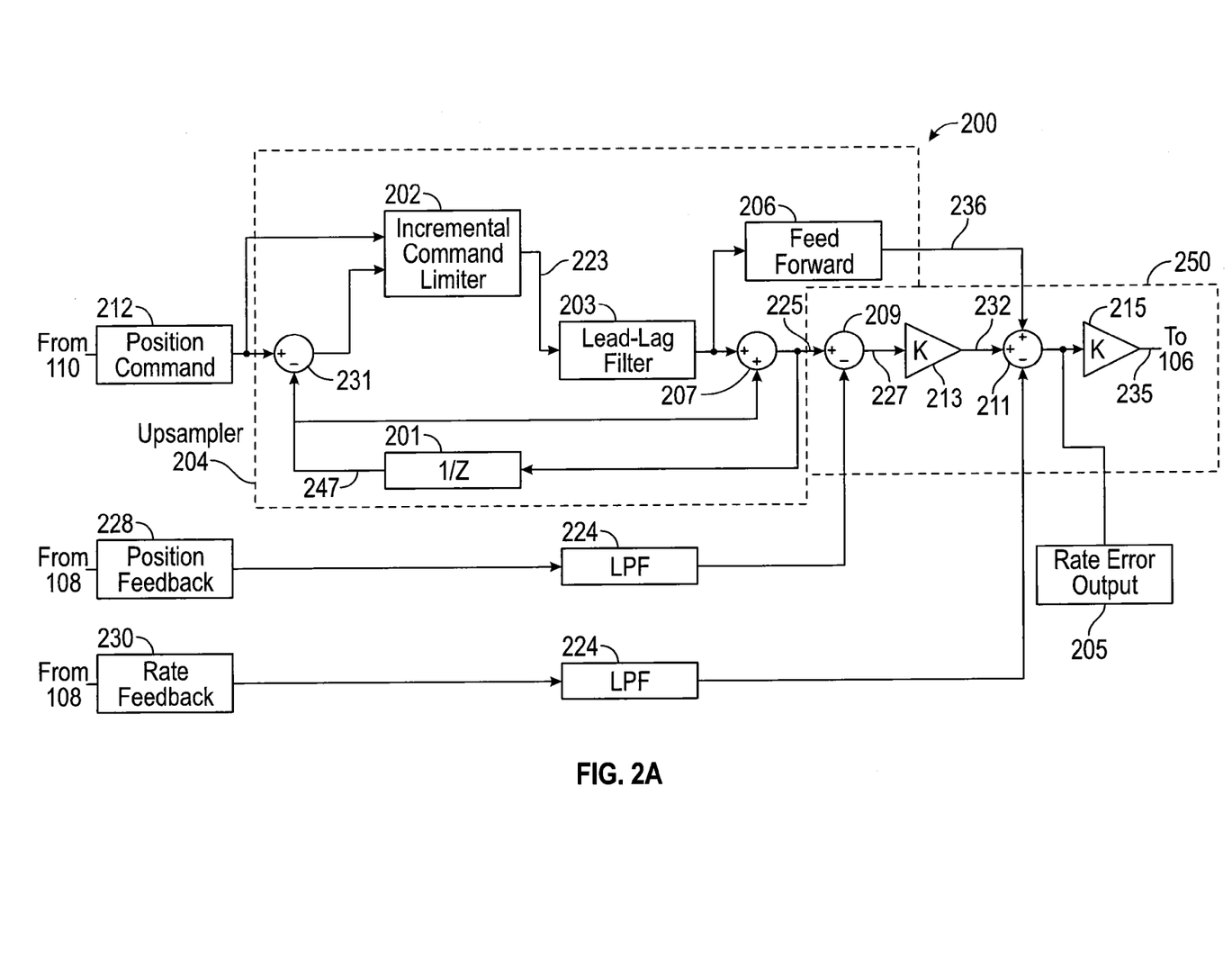
FIG. 2A is a diagram of a simplified position/rate closed loop controller having an integrated upsampler and filter in one embodiment of the system and method for integrating multi-rate systems for electro-mechanical flight actuation using an integrated upsampler and filter.

Referring now to FIG. 2A, a simplified diagram of a position/rate closed-loop controller 200 is shown having an integrated upsampler 204 consisting of a state of position command 201, an incremental command limiter 202, a lead-lag filter 203, a summer 207, a summer 231, and a feed-forward 206.

The position/rate closed-loop controller 200 receives a command signal 112 (FIG. 1) from another controller, for example a position command 212 from the master computer 110. The incremental command limiter 202 interpolates the position command 212 into the sampling rate of the position/rate closed-loop controller 200 and feeds a limited incremental command 223 to the lead-lag filter 203.

The lead-lag filter 203 shapes and filters the limited incremental command 223 in order to attenuate the high frequency components in the position command 212 (e.g., greater than specified bandwidth of the system.) The feed-forward 206 produces a feed forward rate command 236 that reduces phase loss at low frequencies (e.g., less than 2 Hz). Together, the lead-lag filter 203 and feed-forward 206 perform lead-lag compensation for the control loop of the position/rate closed-loop controller 200. The state of position command 201 feeds an upsampler state or current state back 247 to a (first) differentiator or (fourth) summer 231, that is used, in part, to limit the limited incremental command 223 to a maximum allowable command. A (first) summer 207 in the upsampler 204 produces the filtered incremental position command signal 225 from the limited incremental command 223 and the upsampler state 247. A (second) differentiator or (second) summer 209 compares the filtered incremental command signal 225 to a position feedback signal 228 to derive a position error signal 227 which is processed and amplified by amplifier 213 to produce the rate command 232. A (third) summer 211 combines the rate command 232 with a feed forward rate command 236 and a rate feedback 230 to produce the rate error output signal 205. The gain 215 converts the rate error output signal 205 to a torque command 235. In this regard, the second summer 209, the amplifier 213, the third summer 211, and the gain 215 may be considered a processing network 250 for signal processing and producing the torque command 235.

The torque command 235 is sent to the actuator 106 (FIG. 1) that consists of an electric motor commutator (not shown), and electric motor (not shown). The electric motor commutator converts the torque command 235 to PWM duty cycle commands to an inverter that causes the motor to produce a mechanical torque. One or more elliptical filters, biquad filters, or low pass filters 224 help to attenuate noise from position/rate signal(s) from the position/rate feedback sensor 108.

Figure 2B:
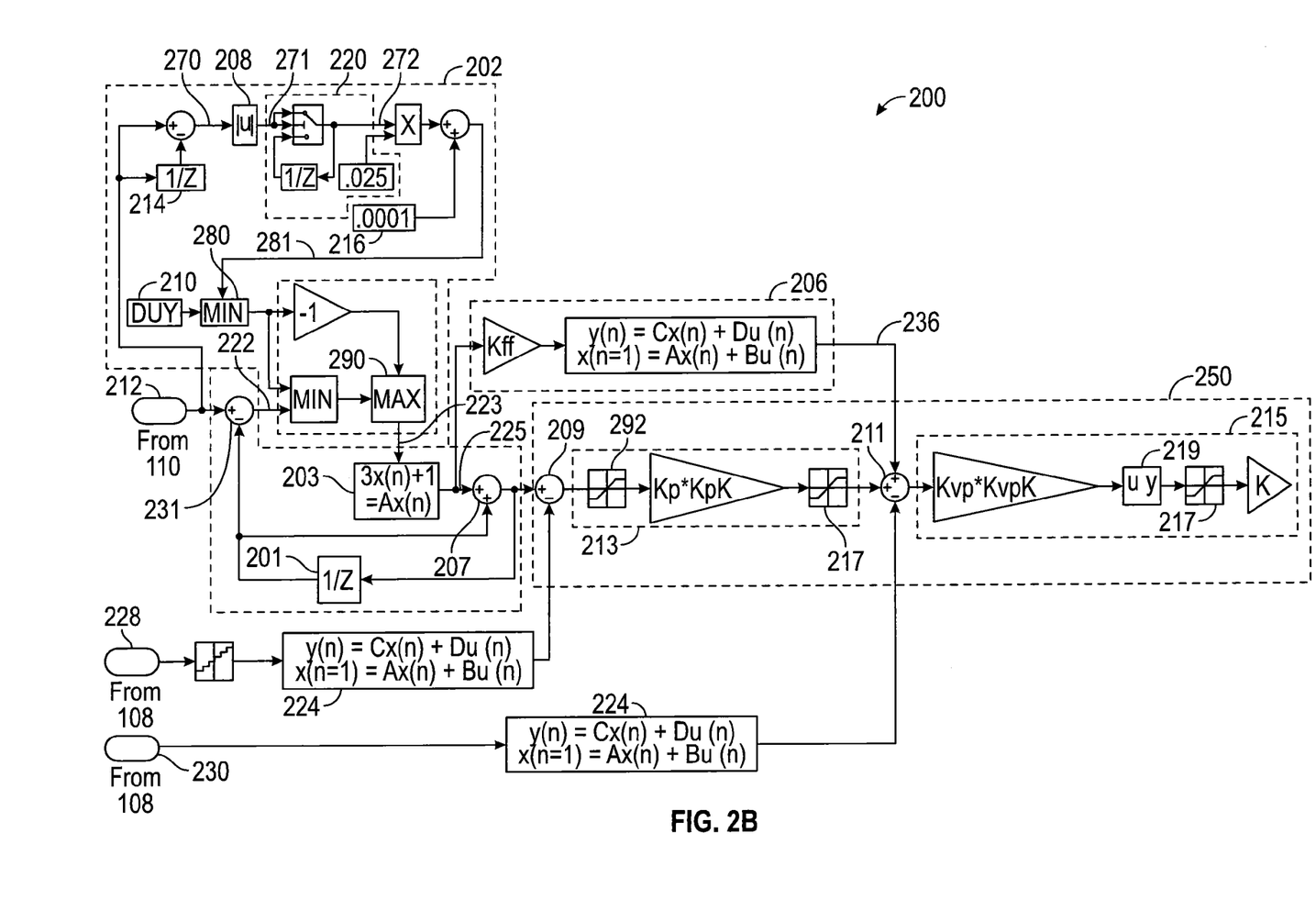
FIG. 2B is a diagram of a position/rate closed loop controller having an integrated upsampler and filter in one embodiment of the system and method for integrating multi-rate systems for electro-mechanical flight actuation using an integrated upsampler and filter.

Referring now to FIG. 2B, a more detailed diagram of a position/rate closed-loop controller 200 is presented to describe additional features. The incremental command limiter 202 differences the one time-step delayed position command 214 from the last received position command 212 from the master computer 110 (FIG. 1) to produce a signed difference signal 270 received by a function 208 that depolarizes the signed difference signal 270 to generate the unsigned signal 271 whose value is an unpolarized absolute value. This unsigned signal 271 is limited to an increment no larger than the intended rate command from the master computer 110. For small rates, a bias 216 shown in one non-limiting example as 0.0001 units, is added to prevent sluggish motion. The function 220 updates its output when its input signal has a positive change, otherwise the function 220 output is the previously held output signal. The function X divides the conditionally updated signal 272 into smaller incremental changes according to the ratio of the sample rate of the master computer 110 (e.g., 50 Hz) and the FAC 114 (e.g., 2000 Hz), shown here as $50/2000$ or 0.025 units. Although the system is illustrated having a FAC 114 whose sample rate is an integer multiple of the computer 110, it should be noted that other ratios can be used. In embodiments, ratios between 1 and the actual ratio between the two system can be used. In embodiments, linear interpolation, logarithmic interpolation, and other non-linear interpolation schemes could be utilized to create the incremental changes without deviating from this disclosure.

For each cycle of the FAC 114, a limit signal 281 comprising the conditionally updated signal 272 is summed with the bias or constant parameter 216, so that after 40 cycles the limited incremental command 223 has a position value equal to the position command 212 sent by the master computer 110. A delta upper yield, or DUY 210, provides a reference value used by an unpolarized clipper 280 to clip the incremental command 222 if necessary to prevent the incremental command 222 from exceeding the maximum allowable position change. A repolarizer 221 restores the positive or negative polarization of the incremental command 222 and in combination with the unpolarized clipper 290 produces the limited incremental command 223.

In embodiments, the amplifier 213 comprises a hysteresis function 292 to prevent least significant bit (LSB) chatter from being introduced into the rate command. In embodiments, a clipper 217 in either the amplifier 213 or power amplifier 215 prevents rate commands from exceeding amplitudes that may create too much stress on the actuator 106 (FIG. 1) or other structures of the vehicle 102.

Figure 3:
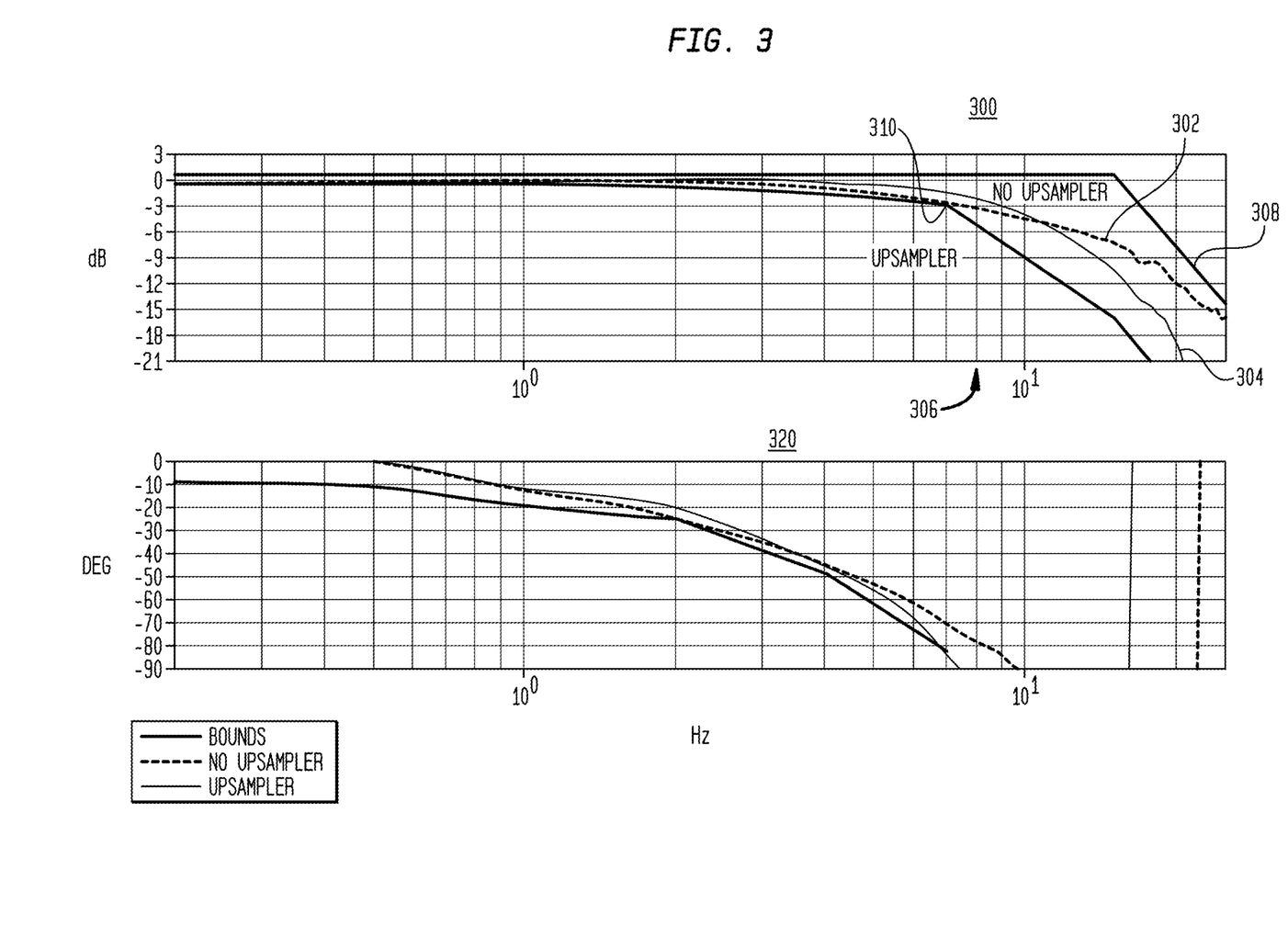
FIG. 3 is a graph illustrating the upsampler transfer function response and phase for position commands in one embodiment of the system and method for integrating multi-rate systems for electro-mechanical flight actuation using an integrated upsampler and filter.

Referring now to FIG. 3, a diagram of the transfer function response 300 from position command to position response is illustrated. The upsampler transfer function response 304 shows a great improvement over the non-upsampled transfer function response 302. The non-upsampled transfer function response 302 nearly touches the acceptable lower bound 310 near the 8 Hz frequency 306 where jack-hammering is observed, while at high frequencies the non-upsampled transfer function response 302 approaches the acceptable upper bound 308. The upsampler transfer function response 304 is between the acceptable lower bound 310 and acceptable upper bound 308 for all frequencies, and also shows a greatly improved roll-off at higher frequencies. In the phase diagram 320, the upsampler transfer function response 304 also shows improved phase response at low frequency.

Figure 4:
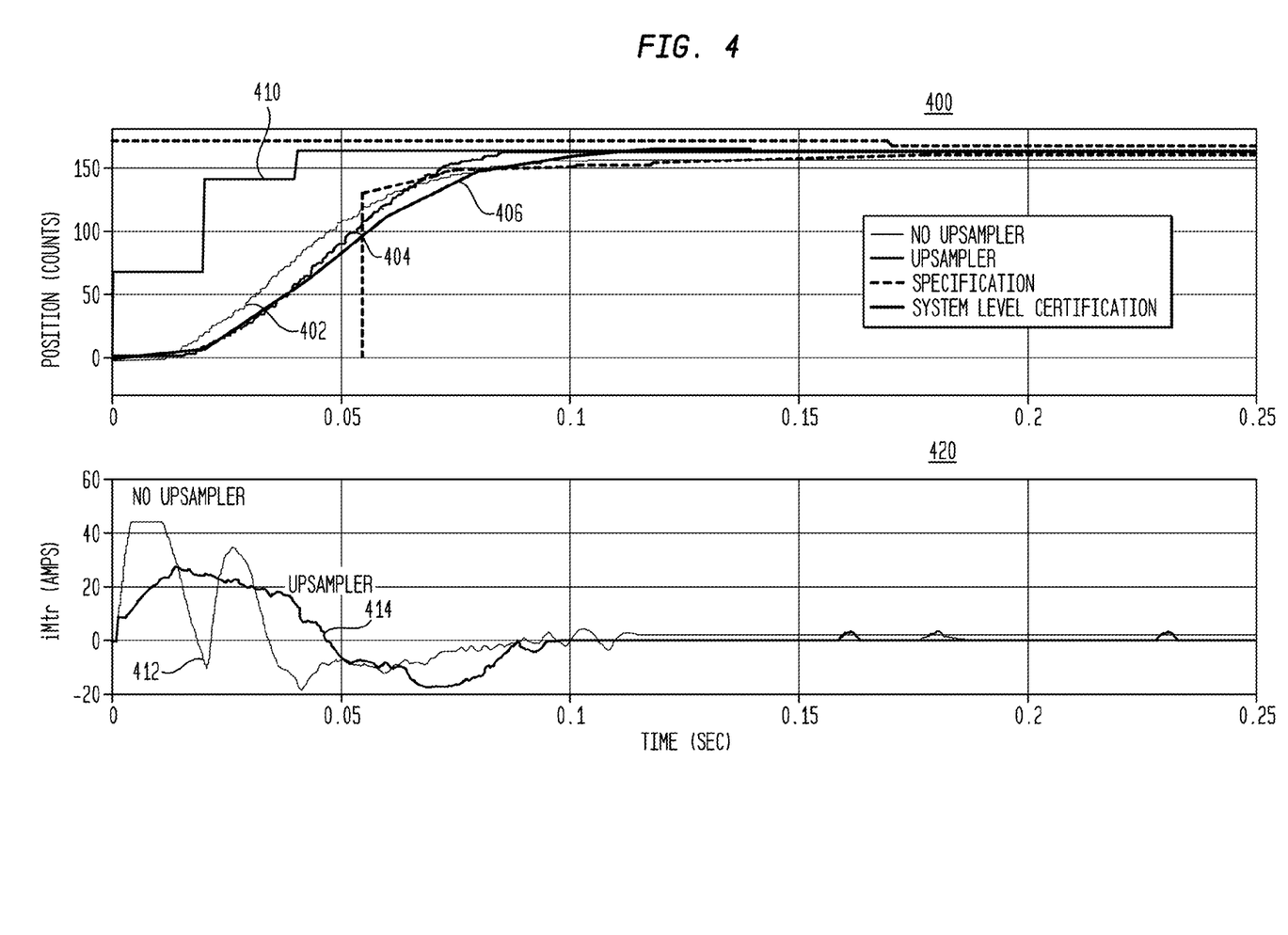
FIG. 4 is a graph illustrating the upsampler instantaneous current response corresponding to position commands for the closed-loop control system in one embodiment of the system and method for integrating multi-rate systems for electro-mechanical flight actuation using an integrated upsampler and filter.

Referring now to FIG. 4, diagrams of the upsampler instantaneous position response 400 and upsampler instantaneous current response 420 during a series of position commands 410 is presented. As illustrated, during a series of position commands 410, the non-upsampled position response 402 accelerates rapidly, but takes longer to reach the level of the final position command 410. The upsampled position response 404 accelerates more evenly along the desired response slope 406, and reaches the level of the final position command 410 before the non-upsampled position response 402.

As illustrated, during the series of position commands 410, the non-upsampled current 412 swings back and forth as the actuator 104 is first accelerated, and then decelerated. At one point, the non-upsampled current 412 even clips, meaning that the maximum amount of current is being applied to the actuator 104. In comparison, the upsampled current 414 illustrates a more smooth amount of power being applied to the actuator 104.

The upsampler instantaneous position response 400 and upsampler instantaneous current response 420 illustrate the "go-stop" nature of the response without upsampler in comparison to the smooth response with the upsampler 202, 204, 206. Further, it is apparent that without the upsampler 202, 204, 206, the system requires a higher amount of instantaneous current to be available, meaning that the upsampler 202, 204, 206 can reduce the size of the power source necessary to power the actuators 104. Further, the non-upsampled current 412 shows the wasting of power when an opposite current is necessary to decelerate the actuator 104.

Figure 5:
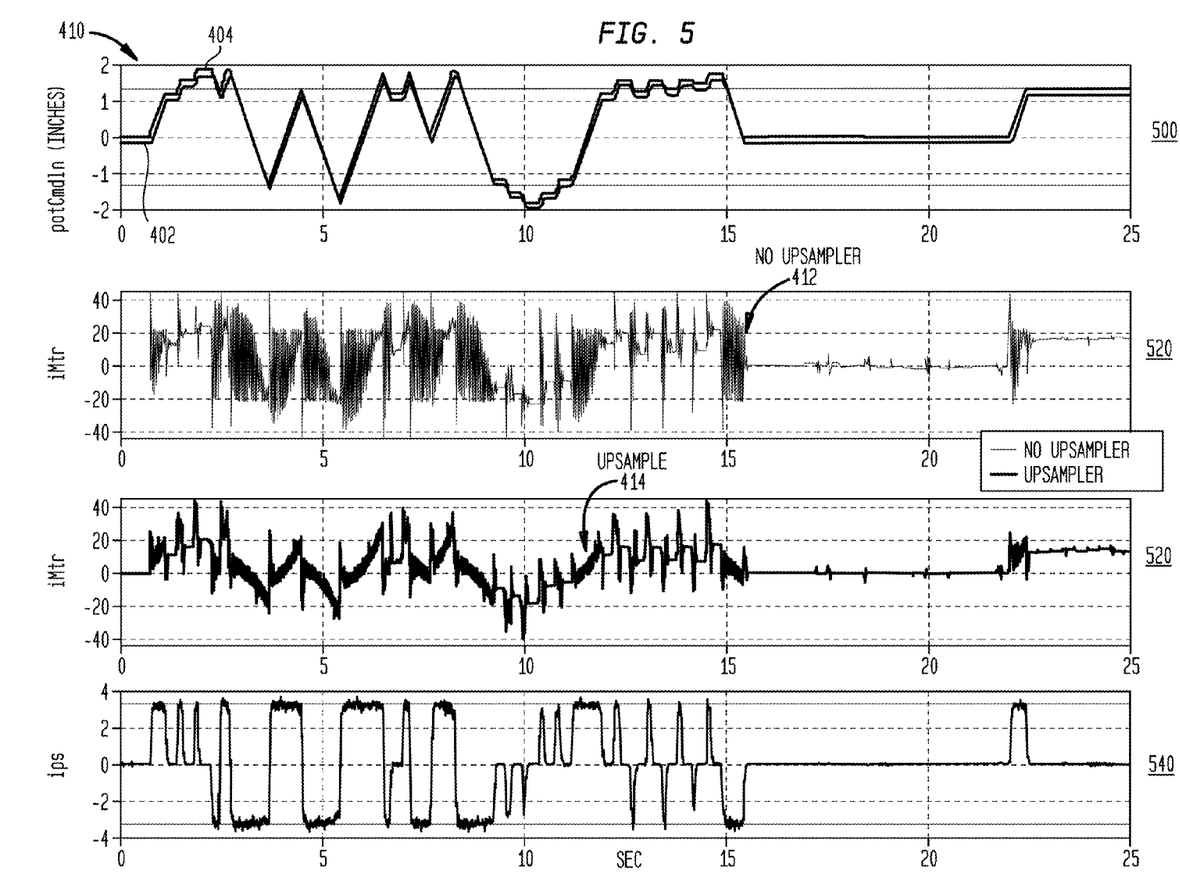
FIG. 5 is a graph illustrating a current response profile corresponding to a plurality of example position commands for the closed-loop control system in one embodiment of the system and method for integrating multi-rate systems for electro-mechanical flight actuation using an integrated upsampler and filter.

This oscillation of the instantaneous current is illustrated in diagrams of the upsampler position response 500, upsampler current response 520, and upsampler pulse widths 540 in the diagrams of FIG. 5. Similar to FIG. 4, in the upsampler position response 500, in response to a series of position commands 410, the upsampled position response 404 reaches the level of the position commands whereas the non-upsampled position response 402 lags. In the upsampler current response 520, the response curves illustrate the difference between the smooth upsampled current 414 response curves, and the oscillating non-upsampled current 412 response curves. The upsampler pulse widths 540 illustrates the corresponding pulse width modulation of the actuators 104.

Although some of the embodiments of the disclosure are directed to flight control systems 100, the methodology and systems described above are also applicable to integrating multi-rate control systems in general. For example, the upsampler 202, 204, 206 or portions of the upsampler 202, 204, 206 can be incorporated into an industrial control system in manufacturing plants when two controllers in a manufacturing process utilize different sampling rates.

The embodiments of the invention shown in the drawings and described above are exemplary of numerous embodiments that may be made within the scope of the appended claims. It is contemplated that numerous other configurations of the system and method for integrating multi-rate systems using an integrated upsampler and filter may be created taking advantage of the disclosed approach. It is the applicant's intention that the scope of the patent issuing therefrom will be limited only by the scope of the appended claims.

What is claimed is:

1. A multi-rate system for controlling an actuator, the system comprising:
   an incremental command limiter that receives a command from a first control system and outputs a limited incremental command;
   a feed-forward that receives the limited incremental command from the incremental command limiter and outputs a feed forward rate command;
   a first differentiator that limits the limited incremental command to a maximum allowable command;
   state of position command that outputs a current state back to the differentiator;
   a first summer that receives the limited incremental command and the current state and outputs an incremental position command; and
   a second summer that combines the incremental position command and the feed forward rate command to output a rate error output signal.

2. The multi-rate system of claim 1, further comprising a lead-lag filter that receives the limited incremental command from the incremental command limiter, and filters the limited incremental command to the feed forward.

3. The multi-rate system of claim 2, wherein the lead-lag filter filters the limited incremental command to the first summer.

4. The multi-rate system of claim 1, further comprising a second differentiator that receives and compares the incremental position command from the first summer to a position feedback signal to derive a position error signal.

5. The multi-rate system of claim 4, wherein the second summer receives the position error signal as a rate command, the feed forward rate command, and a rate feedback to produce the rate error output signal.

6. The multi-rate system of claim 5, further comprising a first amplifier that receives the position error signal from the second differentiator and produces the rate command received by the second summer.

7. The multi-rate system of claim 1, further comprising a second amplifier that receives the rate error output and converts the rate error output to a torque command.

8. The multi-rate system of claim 7, further comprising an actuator that receives the torque command.

9. The multi-rate system of claim 1, wherein the incremental command limiter differences a one time-step delayed position command from a last received position command from the first control system to produce a signed difference signal.

10. The multi-rate system of claim 9, wherein the incremental command limiter includes a first function that depolarizes the signed difference signal to generate an unsigned difference signal whose value is an unpolarized absolute value limited to an increment no larger than an intended rate command from the first control system.

11. The multi-rate system of claim 10, wherein the incremental command limiter includes a bias that is added to the unsigned difference signal prevent sluggish motion.

12. The multi-rate system of claim 10, wherein the incremental command limiter includes a second function that receives the unsigned difference signal and updates the output of the second function when the unsigned difference signal has a positive change.

13. The multi-rate system of claim 12, wherein the incremental command limiter includes a third function that divides a conditionally updated signal from the second function into smaller incremental changes according to a ratio of the sample rate of the first control system and a second control system having a greater sample rate than the first control system.

14. An aircraft comprising:
an actuator;
a position/rate feedback sensor that is connected to the actuator;
a flight control system having master computer and a flight actuator controller, the master computer connected to send a command signal to the flight actuator controller, and the flight actuator controller connected to send an actuation signal to cause the actuator to reposition the flight control surface, wherein the master computer sends the command signal at a first sample rate, and the flight actuator operates at a second, different sample rate; and
an integrated upsampler associated with the flight actuator controller and connected to receive the command signal from the master computer and produce a command to the actuator, the integrated upsampler including
an incremental command limiter that receives a command from the master computer and outputs a limited incremental command;
a feed-forward that receives the limited incremental command from the incremental command limiter and outputs a feed forward rate command;
a first differentiator that limits the limited incremental command to a maximum allowable command;
an upsampler state that outputs a current state back to the differentiator;
a first summer that receives the limited incremental command and the current state from the upsampler state, and outputs an incremental position command; and
a second summer that combines the incremental position command and the feed forward rate command to produce a rate error output signal.

15. The aircraft of claim 14, further comprising a lead-lag filter that receives the limited incremental command from the incremental command limiter, and filters the limited incremental command to the feed forward and to the first summer.

16. The aircraft of claim 15, further comprising a second differentiator that receives and compares the incremental position command from the first summer to a position feedback signal to derive a position error signal, and wherein the second summer receives the position error signal as a rate command, the feed forward rate command, and a rate feedback to produce the rate error output signal.

17. The aircraft of claim 16, further comprising a first amplifier that receives the position error signal from the second differentiator and produces the rate command received by the second summer; and a second amplifier that receives the rate error output and converts the rate error output to the actuation signal.

18. The aircraft of claim 14, further comprising a flight control surface that is connected to be controller by the actuator.

19. The aircraft of claim 14, wherein the second sample rate is greater than the first sample rate.

20. A method for integrating multi-rate control systems having different sample rates, the method comprising:
receiving by an incremental command limiter a command from a first control system, and outputting a limited incremental command;
receiving the limited incremental command by a feed-forward, and outputting a feed forward rate command;
a first differentiator that limits the limited incremental command to a maximum allowable command;
outputting by an upsampler state a current state back to the differentiator;
receiving by a first summer the limited incremental command and the current state from the upsampler state, and outputting an incremental position command; and
combining by a second summer the incremental position command and the feed forward rate command to produce a rate error output signal.

21. A multi-rate system for controlling an actuator, the system comprising:
an upsampler that receives a position command from a first control system, rate limits and filters the position command to output a feed forward rate command and a limited incremental command;
the upsampler including a state of position command that receives the limited incremental command and a current state of position command, and outputs an incremental position command; and
a processing network that receives the incremental position command and the feed forward rate command from the upsampler, and a rate feedback to output a rate error output signal for control of the actuator.

22. A flight control system for enabling operable compatibility between multi-rate flight control systems and control of an actuator, the flight control system comprising:
an upsampler that receives a position command input at a first sampled rate from a control system, the upsampler rate limits and filters the position command to produce a feed forward rate command and a limited incremental command;
the upsampler including a state of position command that receives the limited incremental command and a current state of position command, and outputs an incremental position command; and
a processing network operable at a second sample rate that receives the incremental position command and the feed forward rate command from the upsampler, and a rate feedback to output a rate error output signal for control of the actuator.

* * * * *